US008056136B1

(12) United States Patent
Zaitsev

(10) Patent No.: US 8,056,136 B1
(45) Date of Patent: Nov. 8, 2011

(54) SYSTEM AND METHOD FOR DETECTION OF MALWARE AND MANAGEMENT OF MALWARE-RELATED INFORMATION

(75) Inventor: Oleg V. Zaitsev, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/074,185

(22) Filed: Mar. 29, 2011

(30) Foreign Application Priority Data

Nov. 1, 2010 (RU) ................... 2010144590

(51) Int. Cl.
*G06F 11/00* (2006.01)
*G06F 12/14* (2006.01)
*G06F 12/16* (2006.01)
*G09B 23/00* (2006.01)

(52) U.S. Cl. ........................................ 726/24
(58) Field of Classification Search ............ 726/22, 726/23, 24, 25
See application file for complete search history.

(56) References Cited

U.S. PATENT DOCUMENTS

| | | | | |
|---|---|---|---|---|
| 5,960,170 A * | 9/1999 | Chen et al. | ........... | 714/38.14 |
| 6,564,321 B2 | 5/2003 | Bobo, II | | |
| 6,944,775 B2 * | 9/2005 | Barton et al. | ........... | 713/188 |
| 7,020,895 B2 * | 3/2006 | Albrecht | ........... | 726/22 |
| 7,043,757 B2 * | 5/2006 | Hoefelmeyer et al. | ........... | 726/24 |
| 7,058,857 B2 | 6/2006 | Dallin | | |
| 7,093,002 B2 * | 8/2006 | Wolff et al. | ........... | 709/219 |
| 7,093,239 B1 | 8/2006 | Van Der Made | | |
| 7,239,998 B2 | 7/2007 | Xun | | |
| 7,284,273 B1 * | 10/2007 | Szor | ........... | 726/24 |
| 7,346,928 B1 | 3/2008 | Muhlestein | | |
| 7,395,436 B1 * | 7/2008 | Nemovicher | ........... | 713/193 |
| 7,415,726 B2 * | 8/2008 | Kelly et al. | ........... | 726/24 |
| 7,424,701 B2 | 9/2008 | Kendall et al. | | |
| 7,472,422 B1 * | 12/2008 | Agbabian | ........... | 726/25 |
| 7,490,319 B2 | 2/2009 | Blackwell et al. | | |
| 7,490,352 B2 | 2/2009 | Kramer et al. | | |
| 7,540,030 B1 * | 5/2009 | Zaitsev | ........... | 726/24 |
| 7,577,661 B2 | 8/2009 | Bankston et al. | | |
| 7,593,936 B2 | 9/2009 | Hooks | | |
| 7,631,357 B1 | 12/2009 | Stringham | | |
| 7,636,945 B2 | 12/2009 | Chandnani et al. | | |
| 7,849,502 B1 * | 12/2010 | Bloch et al. | ........... | 726/11 |
| 7,849,507 B1 * | 12/2010 | Bloch et al. | ........... | 726/22 |
| 7,971,258 B1 * | 6/2011 | Liao et al. | ........... | 726/24 |
| 2002/0103783 A1 * | 8/2002 | Muhlestein | ........... | 707/1 |
| 2003/0051154 A1 * | 3/2003 | Barton et al. | ........... | 713/201 |
| 2009/0089879 A1 * | 4/2009 | Wang et al. | ........... | 726/24 |

(Continued)

FOREIGN PATENT DOCUMENTS

| | | |
|---|---|---|
| EP | 1908246 B1 | 11/2009 |
| KR | 20090079625 A | 7/2009 |
| WO | 2010008139 A2 | 1/2010 |

*Primary Examiner* — David García Cervetti
(74) *Attorney, Agent, or Firm* — Michael Fainberg; Arent Fox LLP

(57) ABSTRACT

Disclosed are systems, methods and computer program products for centralized detection and management of malware-related information for use by different security applications. In one example, the centralized security management system comprises a central knowledge database of security information, such as information about various types of malware and other security threats. The system further includes an interpreter module that provides a plurality of customized Extensible Markup Language (XML) interfaces for receiving and parsing information queries from remote security applications developed by different vendors. The system further includes a plurality of local and remote analytical modules (engines) that analyze information queries from the security applications using malware-related information contained in the central knowledge database.

20 Claims, 6 Drawing Sheets

U.S. PATENT DOCUMENTS

2010/0076793 A1 3/2010 Goldstein et al.
2010/0257608 A1* 10/2010 Jeong et al. .................... 726/24
2011/0078309 A1* 3/2011 Bloch et al. .................... 709/224
2011/0107423 A1* 5/2011 Sunder et al. .................... 726/24

* cited by examiner

SYSTEM AND METHOD FOR DETECTION OF MALWARE AND MANAGEMENT OF MALWARE-RELATED INFORMATION

CROSS-REFERENCE TO RELATED APPLICATIONS

This application claims benefit of priority under 35 U.S.C. 119(a)-(d) to a Russian patent application no. 2010144590 filed on Nov. 1, 2010, which is incorporated by reference herein.

TECHNICAL FIELD

The present disclosure relates generally to the field of computer science and, in particular, to systems, methods and computer program products for detection of malware and management of malware-related information for use by different security applications.

BACKGROUND

The growing sophistication and rapid proliferation of malicious software, also known as malware, presents an ever-increasing security threat to personal computers, enterprise computer networks, personal communication devices and the like. Malicious software typically spreads through file transfer over computer networks, such as the Internet, e-mail or other data communication means. To combat spread of malware, a great variety of computer and network security products, such as anti-virus, anti-spyware, anti-phishing, anti-spam, firewall applications, are developed by different security software vendors.

These security applications use different methods for detection of malware and other threats. For example, signature detection techniques uses code templates obtained from known malware to scan objects for those templates in the code. Technologies to check information integrity use the code of known trusted (clean) programs and use them to create a copy of clean program code for subsequent comparison with applications. Information integrity checking systems that create long lists of modified files after operating system updates. Checksum monitoring systems use cyclic redundancy code (CRC) values to determine integrity and authenticity of program files. Emulation techniques are used to execute suspicious programs in a virtual computer environment to detect malicious behavior.

Since various security applications are developed by different vendors, use different malware detection techniques, and have different data communication and data storage formats, these applications are generally incompatible with each other. In addition, each application maintains its own database of malware, which is periodically updated by the vendor with information about new malware and other threats. Due to their incompatibilities, these security products do not share information about detected malware with each other. For example, when a new type of malware or threat is encountered but not detected by one security application, while another security application has recognized this type of malware, sharing of information about new threats would have been helpful to prevent spread of malware. Accordingly, there is a need for an improved system for detection and management of malware-related information and distribution thereof among different security applications.

SUMMARY

Disclosed herein are systems, methods and computer program products for centralized detection, storage and management of malware-related information and distribution thereof among different security applications. In one example embodiment, a centralized security management system comprises a central knowledge database of security information, such as information about various types of malware and other security threats. The system further includes an interpreter module that provides a plurality of customized XML interfaces for receiving and parsing information queries from remote security applications developed by different vendors. The system further includes a plurality of local and remote analytical modules (engines) that analyze information queries from the security applications using malware-related information contained in the central knowledge database.

In one example embodiment, the centralized security system accumulates information from different security threats and provides controlled access to the accumulated information to various security applications and various analytical modules. The different security application and analytical module may include, but are not limited to: computer applications or online services that are provided by different vendors; implement different malware detection techniques, such as signature matching, emulation, whitelisting or blacklisting databases, etc.; reside on different computer systems, such as personal computers, corporate workstation and servers, personal communication devices (e.g., smartphones), network firewalls, etc.; or have different system access policies.

In one example embodiment, the centralized security management system receives, through one of the plurality of XML interfaces, information query about a suspicious object from a remote security application. The interpreter module selects from a plurality of analytical modules two or more different analytical modules for analyzing the suspicious object for presence of malware and provides to the selected analytical modules information about the suspicious object received from the remote security application. Analytical modules employ different malware analysis techniques to analyze the suspicious object. The analytical modules return results of the analysis to the interpreter module. The results include a plurality of information parameters associated with the suspicious object, including a parameter identifying the object as malicious or non-malicious. The interpreter module transmits, through one of the plurality of XML interfaces, the information about identified malicious object to the security application in response to the query.

If, in one example embodiment, as a result of the analysis, at least one analytical module identifies the suspicious object as malicious and another analytical module identifies the suspicious object as non-malicious, the interpreter module identifies correlations between one or more information parameters of the suspicious object and information parameters of other known malicious and non-malicious objects stored in the central knowledge database. If the number of identified correlated malicious objects exceeds the number of identified correlated non-malicious objects, wherein two correlated objects have at least one substantially similar information parameter, the interpreter module identifies the suspicious object as a malware and returns results of the analysis to the security application.

The above simplified summary of example embodiments of invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects of the invention may be employed, and this description is intended to include all such aspects of the invention and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for centralized security management of malware-related information for use by a plurality of different security applications. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
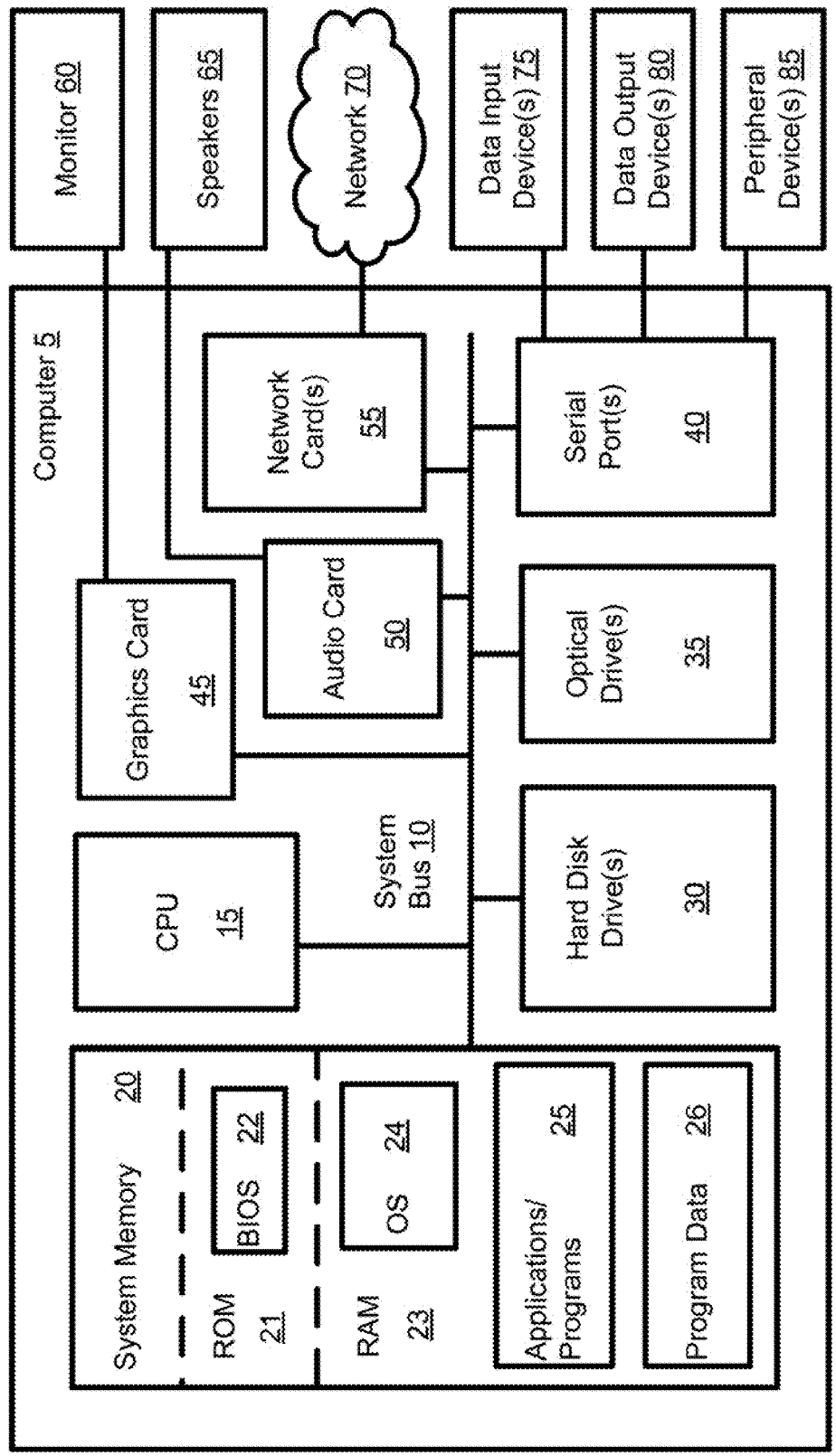
FIG. 1 illustrates a diagram of a computer system for implementing a system for detection of malware and management of malware-related information in accordance with one example embodiment.

FIG. 1 depicts one example embodiment of a computer system 5, such as a network server, suitable for implementing the centralized security system of the present invention, as well as other computing devices that may be utilizing services of the security system, including but not limited to personal computers and servers running security applications, mobile communication devices, network servers, and other devices. As shown in FIG. 1, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be, implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional® or other type of operating system, that is responsible for management and coordination of processes and allocation and sharing of hardware resources in computer system 5. System memory 20 also stores applications and programs 25, such as security applications, that are running on the computer 5. System memory 20 also stores various runtime data 26 used by programs 25.

Computer system 5 may further include hard disk drive(s) 30, such as 1 terabyte SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMS, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also, be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

Figure 2:
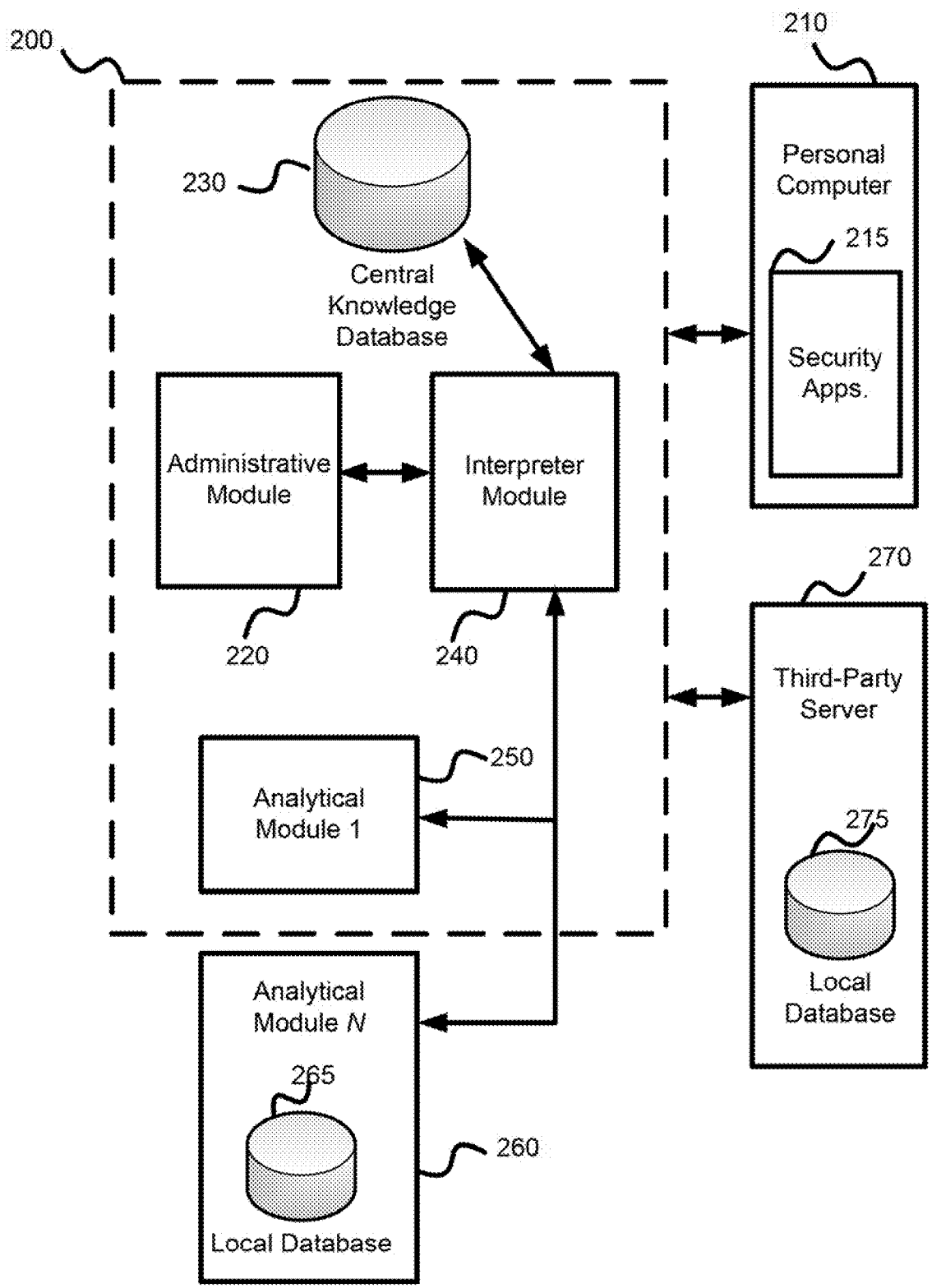
FIG. 2 illustrates a diagram of a system for detection of malware and management of malware-related information in accordance with one example embodiment.

FIG. 2 illustrates a schematic block diagram of an example embodiment of a centralized security system 200 of the present invention. As depicted, system 200 may be implemented as a network server or a group of servers connected to the Internet, Intranet or other public or private network. System 200 includes an administrative module 220, interpreter module 240, central knowledge database 230, and various internal and external analytical modules 250 and 260. Internal analytical modules 250 may be local to the system 200, e.g., deployed on the same server or on the same local area network. External analytical modules 260 are typically remote from the system 200, e.g., deployed on a remote application server. Various modules may be implemented using hardware, software or a combination thereof. In one example embodiment, the system 200 is accessible to different external security applications 215 residing on remote PCs and workstations 210, external analytical modules 260, third-party servers 270, mobile communication devices (e.g., smartphones), network firewalls and other devices that are subject to various security threats and attacks.

In one example embodiment, administrative module 220 controls access to the security system 200. For example, administrative module 220 may maintain a plurality of access policies for various types of security applications 215, analytical module 250 and 260, third-party servers 270 or other entities registered with system 200. Each access policy may contain information about the entity that uses the services of the system 200, such as the name of the company, the number of user licenses held by this company for accessing the security system 200, the type of security application(s) used by the company to access the system 200 and the level of access allowed to that entity. For example, a full access may allow the given entity to make an unlimited number of requests for information from the security system 200 as well as to submit information about new threats to the security system 200. In contrast, a partial access will allow the entity to make a limited number of requests for information. In operation, administrative module 220 receives all information queries and other types of communications from entities registered with the system, indentifies the entity, checks the associated access policy, and forwards the query to interpreter module 240.

In one example embodiment, the interpreter module 240 performs interpretation of information queries from different security applications 215. Generally, an information query may contain a description of a security problem encountered by the security application 215 or a suspect file, an email message, a link, etc., which security application 215 could not conclusively classify as malicious or not. Since different security applications 215 may be developed by different software vendors, may use different programming languages, may run on different platforms and may have different communication protocols, the interpreter module 240 provides a plurality of customized Extensible Markup Language (XML) interfaces that allow communication with different security applications 215. For example, the administrative module 220 may provide to the interpreter module 240 information identifying the application from which the query is coming, and the interpreter module 240 will select the appropriate XML interface for parsing and processing the query from the security application. In this manner, security system 200 provides platform independent support for different security applications 215 developed by different vendors and other entities seeking information about unknown types of malware and other threats.

In another example embodiment, the interpreter module 240 delegates analysis of information queries to different modules 250 and 260. For example, the interpreter module 240 may request one or more of the available analytical modules to analyze information about a suspicious file or activity received from security application 215. Since different analytical modules 250 and 260 may deploy different malware detection techniques for analyzing and detecting malicious software or other types of threats, they may require different malware-related information from central database 230 in order to determine if the suspicious file or activity is malicious, to classify this type of threat, and to determine the appropriate defensive actions. To that end, the interpreter module 240 provides different types of XML interfaces for communication with these analytical modules. For example, interpreter module 240 may use a custom XML interface to provide to emulation module 250 a suspicious object and then use this XML interface to request/receive additional information from the central knowledge database 230 for use by that analytical module. In contrast, interpreter module 240 may use a different XML interface to provide to log parser module 260 a log of suspicious network activity and then use this XML interface to request/receive additional information from the knowledge database 230 for use by that analytical module. Using customizable XML interfaces, system 200 may easily integrate different analytical modules 250 and 260 that provide different types of analytical logic for detecting malware.

In one example embodiment, analytical modules 250 and 260 contain processing logic for analyzing and classifying security threats that cannot be identified by security applications 215. These modules can run both within system 200 (as module 250), and outside it (as module 260). In an example embodiment, analytical modules 250 and 260 may include one or more servers executing several different antivirus engines developed by different software developers. Each antivirus engine may maintain its own local database 265 containing malware-related information. The interpreter module 240 can be configured to simultaneously test the suspect file(s) using various available antivirus engines. In other words, the same suspicious file can be analyzed by two or more analytical modules substantially at the same time. The results of the analysis, which indicate whether the suspect file is malicious or not and what defensive action must be taken if the file is malicious, are communicated to the interpreter module 240, which in turn forwards the results of the analysis to the security application 215 that initiated the query. In addition, interpreter module 240 may classify and add new malicious file(s) to the central knowledge database 230 for future reference, as will be described in greater detail herein.

In another example embodiment, another analytical module 250 or 260 may include an emulation engine that executes the suspect file(s) provided by the interpretation module 240 in a secure virtual environment. The virtual environment may be configured to correspond to the original environment of the computer 210 in which the suspect file was found by the security application 215 based on the information available about the computer 210 in the administrative module 220. For example, if the computer 215 runs Windows XP® operating system, the virtual environment may be created to simulate Windows XP® OS. Example system for malware detection using emulation techniques is disclosed in the commonly-owned U.S. Pat. No. 7,614,084, which is incorporated by referenced herein in its entirety. The results of the analysis indicating whether the suspect file is malicious or not and what defensive action must be taken if the file is malicious are communicated by the interpreter module 240 to the application 215. In addition, interpreter module 240 may classify and add new malicious file(s) to the central database 230 for future reference.

In another example embodiment, another analytical module 250 or 260 may include a signature analyzer engine, which compares a signature (e.g., hash) of a suspicious file provided by the security application 215 with its local database 265 containing signatures of known malicious files or signatures contained in the central database 230. If the signature analyzer engine determines that the signature of the suspicious file matches the signature of a known malware, the suspicious file is identified as that type of malware, which is reported to the interpreter module 240. The interpreter module 240 may in turn check in the central database 230 what type of defensive actions must be taken with respect to that specific type of malware. The interpreter module 240 then communicates to the security application 215 information about the detected malware and information about the type of actions that need to be taken to protect computer 210 from this type of malware. In the event the detected malware is a new type of malware, the interpreter module 240 may classify this malware appropriately and add it to the central knowledge database 230 by for future reference.

In another example embodiment, analytical module 250 or 260 may include a log parser engine. This engine may be configured to analyze execution logs of suspicious programs or logs of suspicious network activity detected by the security application 215 on computer 215 or associated network. Program execution log generally shows a list of events of execution of a suspicious program, such as suspicious system calls or memory accesses. Network log generally shows a listing of suspicious network activities, such as unusual traffic volume, unauthorized login attempts or file access, eavesdropping activity, etc. If the log parser engine recognizes a malicious program activity or a network attack, it is reported to the interpreter module 240, which in turn reports it to the application 215 along with the information on the type of defensive actions that must to be taken with respect to the malicious program or network threat. In addition, the malicious program or network activity may be classified and added to the central database 230 by the interpreter module 240.

Yet in another example embodiment, the security system 200 may be configured to provide information about known and newly discovered malware and computer threats to third-party expert systems hosted on remote servers 270. For example, the third-party expert system 270 may have its own local malware databases 275, but may need to update it with the current information about new types of malware accumulated by the security system 200. In this case, server 270 may periodically query system 200 for information about new types of malware or to collect statistical information about various types of malware and other threats. The administrative module 220 would determines if the server 270 is registered with the system using server's access policy, and forward authorized queries to the interpreter module 240. Module 240 would receive the request using an appropriate XML interface, which would parse the information query from the server 270, and then query central knowledge database 230 for the requested information about certain type of malware. The retrieved information is forward using the appropriate XML interface to the server 270.

In one example embodiment, the security system 200 can be easily scalable to accommodate the growing number of different security applications 215 and remote servers 270 that utilize system's services. The number of identical analytical module 250 and 260 may be increased or decreased in order to increase processing power and efficiency of the security system 200. For example, the system may be scaled to include three servers running emulation engines, five servers running signature analyzer engines, two servers running log parser engines and other types of analytical modules depending on the volume of information queries from different security applications 215 and servers 270. In one example embodiment, the interpreter module 240 can be configured to manage job delegation among all analytical modules in order to optimize system efficiency and to achieve balanced load distribution among internal and external analytical modules using known techniques.

In one example embodiment, the central knowledge database 203 may include one or more SQL servers that can be accessed by the interpreter module 240 using XML interfaces. In general, the database 230 is a depository of information about known security threats, such as computer viruses, spyware, spam, phishing scripts, network attacks and other types of security threats, as well as information about various types of defensive actions against these security threats, such as quarantine or removal of the detected malware, termination of execution of infected files, blockage of Internet or e-mail services, etc. In addition, the central knowledge database 230 may contain a whitelisting database, which contains information about non-malicious objects, such as files, scripts, plug-ins, applications, websites, etc. Furthermore, central knowledge, database 230 may include information about different types of security applications utilizing services of the security system, such information includes software developer/vendor info, software version info, local malware database update status, access level (full, limited, etc.), application troubleshooting info, etc. In addition, database 230 contains information about local and remote analytical modules 250 and 260, including software developer/vendor info, software version info, local malware database update status, analytical techniques used by the module (e.g., signature scanning, emulation, whitelisting knowledge database, etc.), module troubleshooting info, etc. The central knowledge database 230 may be periodically updated by the interpreter module 240 with information about new type of malicious and non-malicious objects detected by the analytical modules 250 and 260 and other information.

Figure 3A:
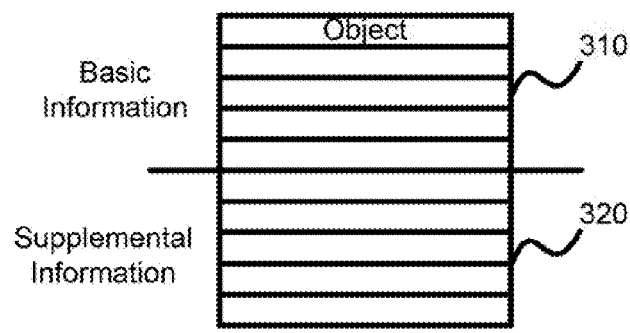
FIGS. 3A, B, C illustrate diagrams of object data structures for storage of malware-related information in accordance with various example embodiments.
Figure 3B:
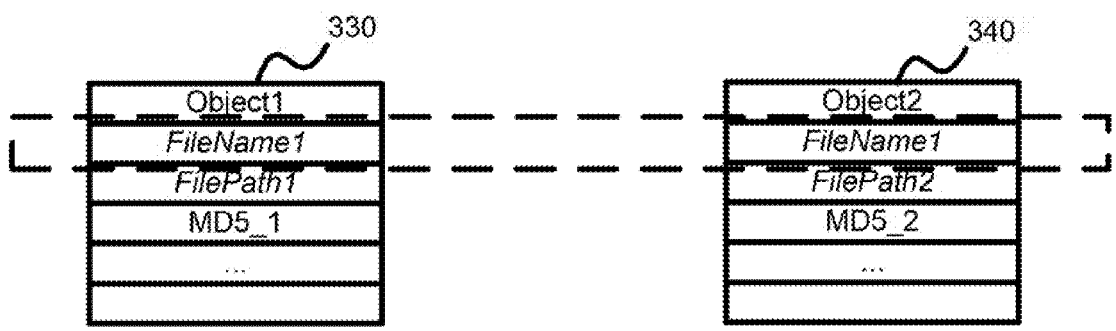
Figure 3C:
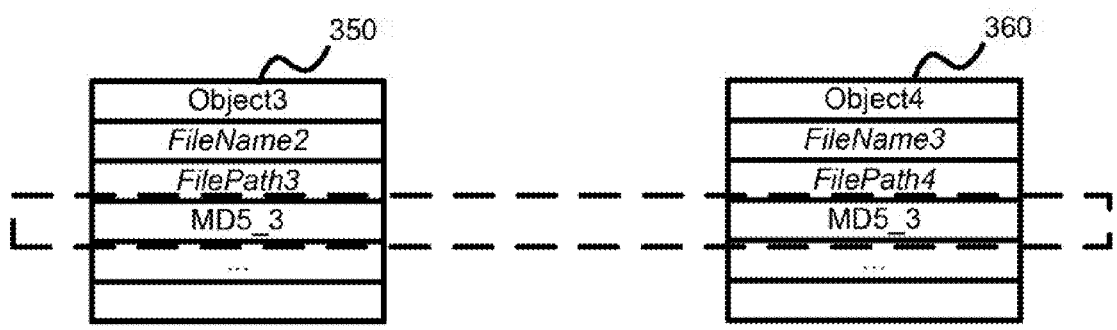

In one example embodiment, the information about various malicious objects, i.e., malicious files, programs, scripts, websites etc., may be stored in the form of objects of classes in the system 200. FIGS. 3A-C illustrate example embodiments of classes for storing malware related information within security system 200. FIG. 3A illustrates that all information on the parameters in that class may be divided into two parts—basic information 310 and supplemental information 320. Basic information 310 may include, for example, information on the type of malicious object (file name and file path), object source, where and when the object was created, to whom it was addressed, etc. All other parameters describing this object include supplemental information 320. For example, the supplemental information may include, but is not limited to: MD5 hash of the malicious object, which may be used in signature analysis of the object; identification of systems components most susceptible to this type of malicious object; information about defensive actions that must be taken to protect computer system from this type of objects, such as quarantine or removal of the malicious object, termination of execution of infected files, blockage of Internet or email access, etc.

In one example embodiment, analytical modules 250 and 260 create new types of objects for each analyzed suspicious file or threat. The analytical modules complete all basic and all supplemental information collected during malware analysis and send it to the interpreter module 240 through the appropriate XML interfaces. Since these analytical modules perform different types of analysis and use different information from central database 230, the resulted data objects for the same malicious file or threat may be different; they may have different number of fields and have different information in the same fields. For example, as shown in FIG. 3B, analytical modules 250 and 260 may create two different objects 330 and 340 for the same suspicious file (FileName1), however, the rest of the basic and supplemental information for these objects may be different; for example, the object may have different file paths because information queries for this suspicious file came from different security applications; the objects may have different MD5 hash values because the files might have been changed. Therefore, the interpreter module 240 must identify that these objects are related and must be correlated to each other before this information can be added to the central knowledge database 230 and reported to security applications 215.

In one example embodiments, the related objects may be analyzed by the interpreter module 240 and correlated based on the matching parameters to obtain all alternatives for the use of non-matching parameters. For example, objects 330 and 340 can be correlated by name and all MD5 hashes for objects with the same name can be found, as shown in FIG. 3B. Similarly, the interpreter module 240 can correlate objects 350 and 360 by MD5 hash values and obtain all the alternative names in the users' systems (under different names, in different locations), as shown in FIG. 3C. In this manner, related objects, including malicious and non-malicious objects, may be identified and correlated to each other. If new parameters have been found during the correlation process, interpreter module 240 updates supplemental information fields for the given object in the central database 230 with the new parameters and provides updated information to the security application that requested it.

Figure 4:
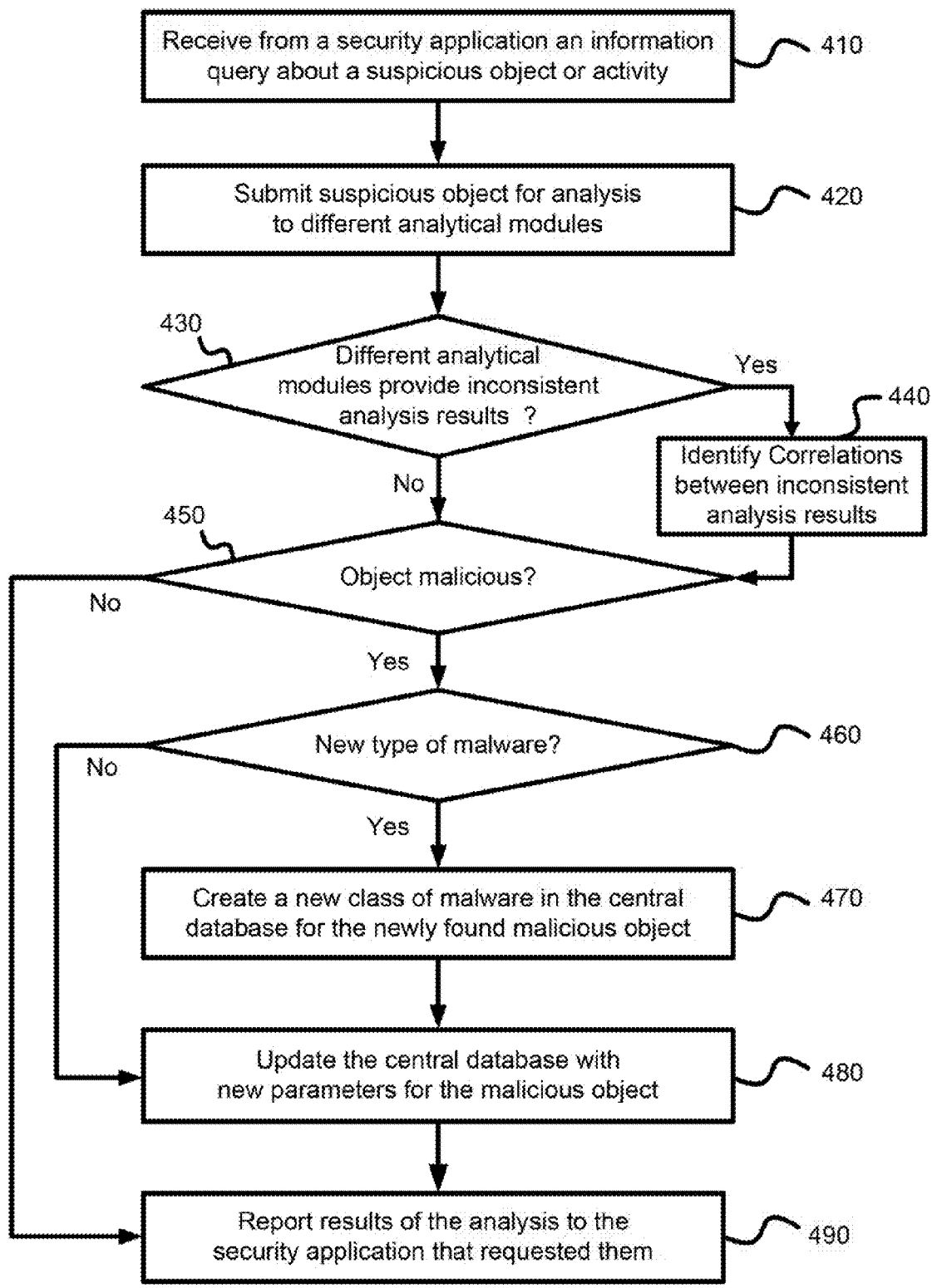
FIG. 4 illustrates a flowchart a method for detection of malware and management of malware-related information in accordance with one example embodiment.
Figure 5:
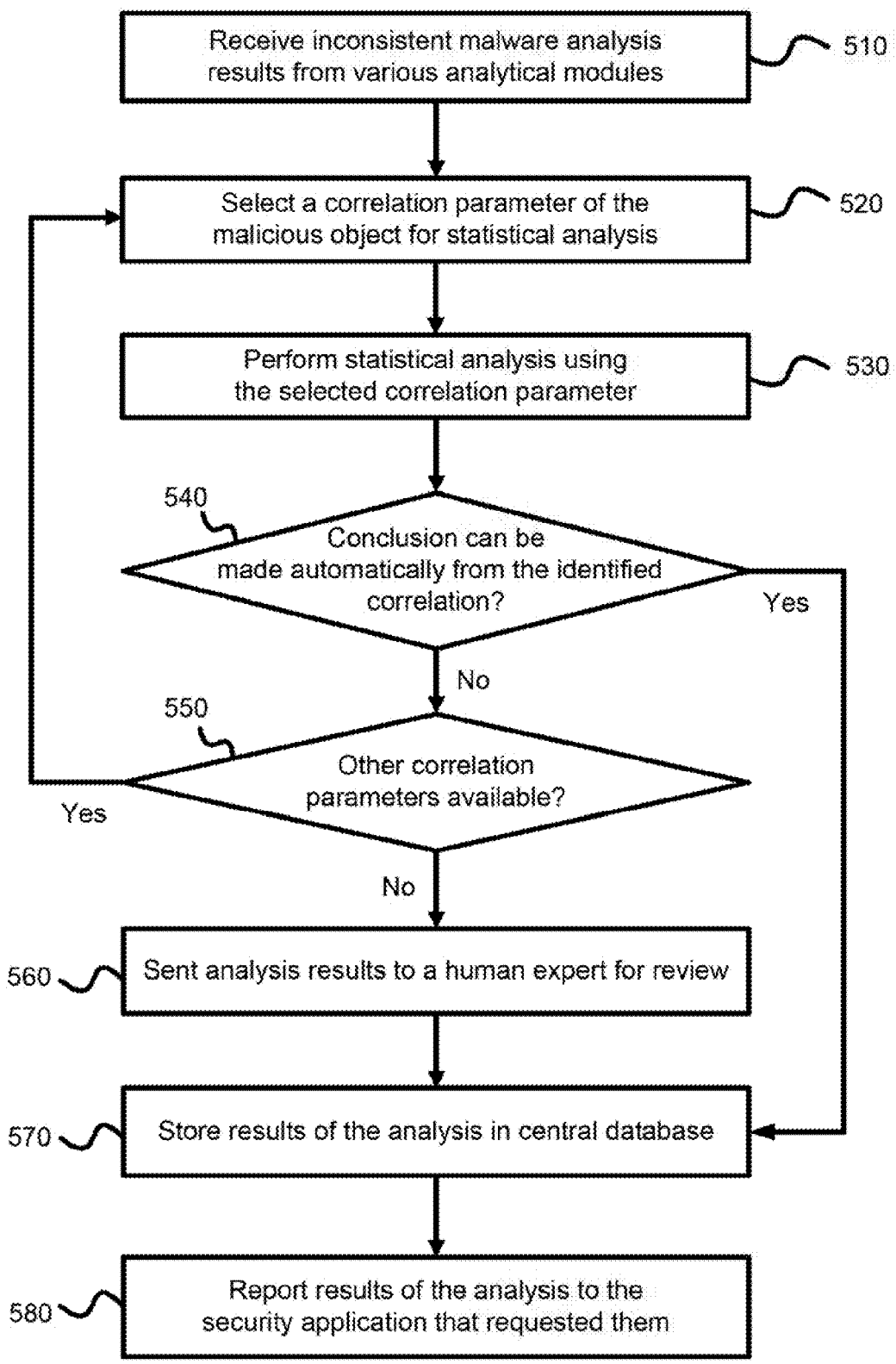
FIG. 5 illustrates a flowchart of another method for detection of malware and management of malware-related information in accordance with one example embodiment.

FIG. 4 illustrates one example embodiment of the operating algorithm of the interpreter module 240. In step 410, the interpreter module receives from a security application 215 an information query about a suspicious object (such as a file, link or activity log). In step 420, the interpreter module selects one or more analytical modules 250 or 260 for analysis of the given query and forwards the queries to the selected modules through the associated XML interfaces. During analysis of the object by the analytical module(s), the interpreter module may receive requests for from the selected analytical modules for information from the central database 230. The interpreter module 240 provides to the analytical module all available information from the database 230 necessary for analysis of the suspicious object. If, in steps 430, analytical modules provide inconsistent results, i.e., one analytical module identifies the suspicious object as malicious and another analytical module identifies the object as not malicious, the interpreter module 240 in step 440 may identify correlations between inconsistent results provided by, analytical modules in order to conclusively determine if the object is malicious or not. In one example embodiment, correlations may be identified using statistical analysis (example of which is illustrated in FIG. 5). In other embodiments, expert systems, fuzzy logic rules, genetic algorithms or security rating system disclosed in a commonly owned U.S. Pat. No. 7,530,106, which is incorporated by reference herein, may be used to reconcile inconsistent results. If all analysis results are consistent and, in step 450, the suspicious object is identified as not malicious by all analytical modules, the process moves to step 490, in which the interpreter module reports the results of the analysis to the security application that requested it. If, in step 450, the object is identified as malicious by all analytical modules, the interpreter module determines if a new type of malware has been detected by, for example, checking if any information about this malicious object is available in the central database 230. If no information about the detected malicious object is available in the central database, the interpreter module creates a new class of malware for the new malicious object in database 230, in step 470. If the object is not new, the interpreter module updates, in step 480, the central database records with any new parameters found during analysis of the object by analytical modules. Finally, at step 490, interpreter module reports results of the analysis to the security application 215 that originated the information query.

FIG. 5 illustrates one example embodiment of statistical analysis algorithm performed by the interpreter module 240 for identifying correlations between inconsistent analysis results received from two or more analytical modules. In step 510, the interpreter module receives inconsistent analysis results from two or more analytical modules. The results are inconsistent when some analytical modules identify the suspicious object as malicious while other analytical modules as non-malicious. For example, a signature analyzer may determine that a suspicious file is not malicious, while an emulation engine may determine that the same file exhibits malicious activity. In this case, the interpreter module may use statistical analysis to identify correlations between various parameters of the suspicious object and similar parameters of other malicious and non-malicious objects stored in the central database 230. To that end, in step 520, the interpreter module selects one of the basic or supplemental parameters (310 or 320) of the suspicious object. For example, the file path (or link) of the given suspicious object may be selected as a suitable correlation parameter. At step 530, the interpreter module performs the statistical analysis by searching the central database 230 for other objects having substantially similar file path parameters (e.g., objects downloaded from the same website as the suspicious object). If, in step 540, the interpretation module determines that the total number of identified malicious objects having substantially similar file path parameter exceeds the total number of non-malicious objects having substantially similar file path by a certain percentage (e.g., at least 25%) or other criteria, then the interpretation module may conclude that the suspicious object is malicious and the process flow proceeds to step 570. However, if in step 540, the interpretation module does not find any correlations between file path parameters of the suspicious object and other objects in the central database, and therefore cannot reach a conclusion as to whether the suspicious object is malicious or not, the interpreter module may select another parameter is step 520 and repeat the statistical analysis using that parameter. If in steps 550 all parameters have been used, but the statistical analysis have not rendered a conclusive answer as to whether the object is malicious or not, all analysis results may be sent to a human expert for review in step 560. Next, in step 570, the interpreter module stores/updates results of the statistical analysis or results of the human expert review in the central database, and in step 580, reports results of the analysis to the security application 215 that originated the information query.

Figure 6:
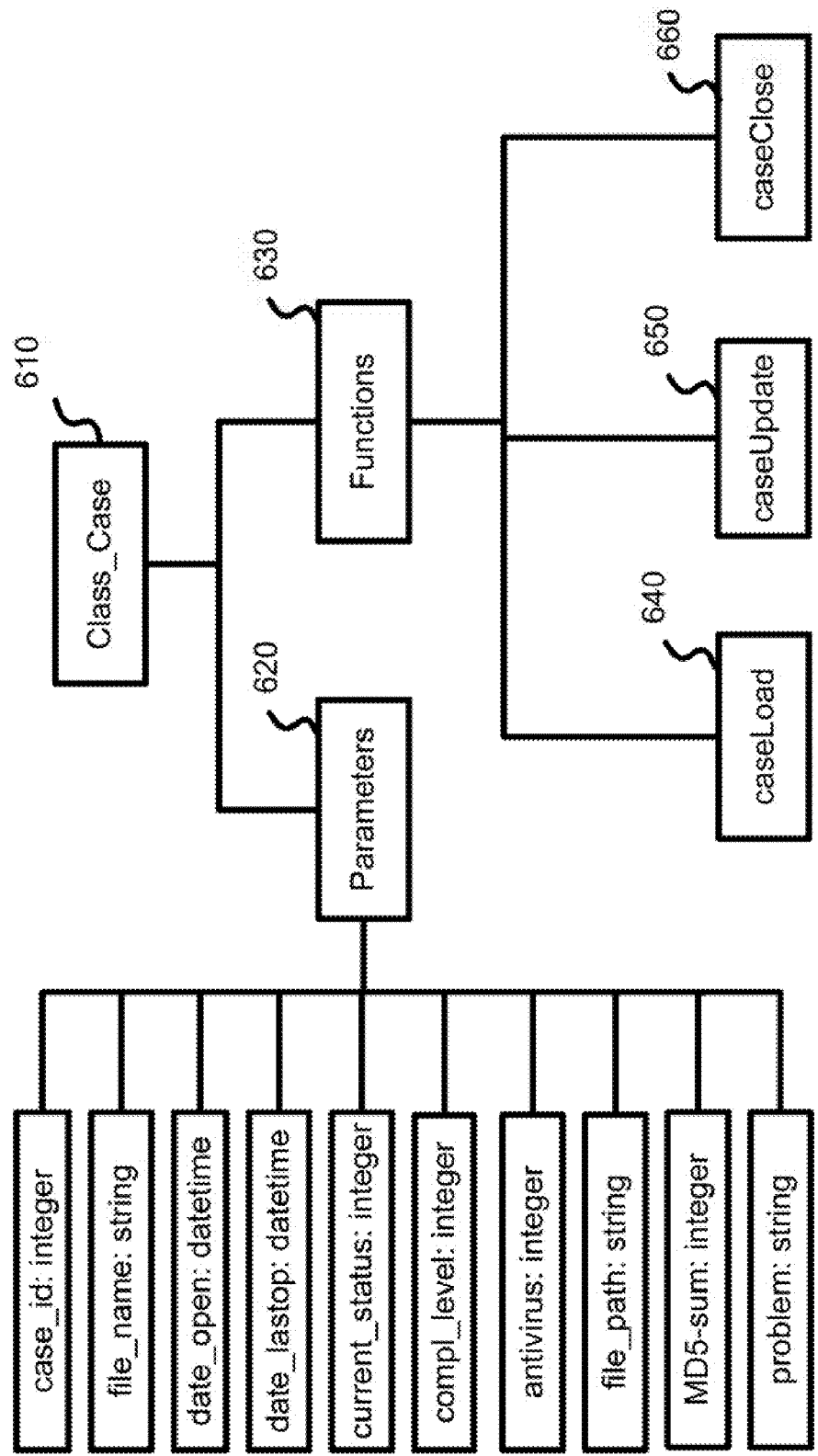
FIG. 6 illustrates a diagram of an object-oriented class data structure for storage and management of malware-related information in accordance with one example embodiment.

FIG. 6 illustrates an example embodiment of a class data structure used by the interpreter module 240 for instantiating objects of class Case shown in FIG. 3 for storage of malware-related information. The class Case 610 defines a plurality of parameters 620 (basic and supplemental) for objects stored in the central database 230 and functions 630 for accessing and modifying the object's parameters. In one example embodiment, the class can be defined using XML format and various parameters can be accessed using XML interfaces. A brief description of different functions of class Case and their uses are provided below.

For example, the interpreter module 240 may use function CaseLoad 640 to search objects in the central database 230 by various parameter fields. This function can be used, for example, during statistical analysis of the suspicious object and during object updates. The function returns a list of objects that have one or more of the requested search parameters. The objects can be searched using any of the following parameters:

case_id: integer—unique object identifier;
    file_name: string—name of the object;
    date_open: datetime—date and time when the object was created;

date_lastop: datetime—date and time of the last modification of this object;

current_status: integer—current status of the object (malicious or non-malicious);

compl_level: integer—complexity level of the object;

antivirus: integer—identifier of the analytical module that detected this object;

file_path: string—information about object source path (e.g., URL);

MD5-sum: integer—MD5 hash of the object; and problem: string—description of the behavior of the malicious object.

The interpreter module 240 may use function CaseUpdate 660 to modify/update parameters of object identified by case_id when, for example, new information about this object is provided by the analytical modules. The interpreter module may use function CaseClose 670 to store updates in the central database and closes object identified using case_id.

The above class structure can be expanded with other parameters that describe malicious and non-malicious objects stored in the central database 230 as well as additional functions that allow the interpreter module 240 to access, search and modify data stored in objects instantiated from the class Case. In one example embodiment, internal analytical modules 250 also support the same class structure which simplifies exchange of information between these analytical modules, the interpreter module and the central database. To communicate with external analytical modules that deploy other class structures for maintaining and transferring data, the interpreter module may implement XML interfaces that are customized to accept data from those analytical modules in its native format and map the received data into the format of the class Case for processing and storage in the system 200.

The centralized security system of the present invention provides many advantages over prior art. One advantage of the centralized security system is that it provides greater flexibility in setup of corporate security infrastructures that deploy different security and antivirus applications, firewalls and other products developed by different vendors. For example, a security application on a corporate network may have security rules that specify that, if an unknown but suspicious activity is detected on one of user workstations, the user's access to the Internet and e-mail must be blocked until the actual danger of the detected threat is ascertained by the security personal. However, if the security application has access to the centralized security system of the present invention, the application can query the security systems using available information about the detected activity and receive in real-time response as to whether the detected activity is in fact malicious or not and the information about appropriate defensive actions. The security system improves effectiveness of different security applications in protecting corporate networks from malware and other threats.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the implementations of the invention are shown and described herein. It will be appreciated that in the development of any such actual implementation, numerous implementation-specific decisions must be made in order to achieve the developer's specific goals, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer implemented method for detecting malware, the method comprising:

selecting from a plurality of analytical engines two or more different analytical engines for analyzing a suspicious object for presence of malware, wherein different analytical engines employ different malware analysis techniques;

providing to the selected analytical engines information about the suspicious object;

receiving from the selected analytical engines results of the analysis of the suspicious object, wherein the results includes a plurality of information parameters associated with the suspicious object, including a parameter identifying the object as malicious or non-malicious;

if at least one analytical engine identifies the suspicious object as malicious and at least one other analytical engine identifies the suspicious object as non-malicious, identifying correlations between one or more information parameters of the suspicious object and information parameters of other known malicious and non-malicious objects stored in a knowledge database, wherein two information parameters are correlated when said parameters are substantially similar to each other; and identifying the suspicious object as a malware if the number of identified malicious objects correlated to said suspicious object exceeds the number of identified non-malicious objects correlated to said suspicious object, wherein two objects are correlated when said objects have one or more correlated information parameters.

2. The method of claim 1 further comprising:
providing a plurality of first different XML interfaces being customized to receive data from and transmit data to different security applications; and
providing a plurality of second different XML interfaces being customized to receive data from and transmit data to different analytical engines.

3. The method of claim 2 further comprising:
receiving, through one of the plurality of first XML interfaces, an information query about the suspicious object from a remote security application; and
transmitting, through one of the plurality of first XML interfaces, the information about identified malicious object to the security application in response to the query.

4. The method of claim 2, wherein selecting two or more analytical engines from the plurality of analytical engines is based at least in part on the balanced distribution of processing load among the plurality of different analytical engines.

5. The method of claim 2 further comprising:
receiving, through one of the plurality of second XML interfaces, from a selected analytical engine a request for information about a known malicious object during analysis of the suspicious object by said selected analytical engine;
retrieving the requested information from the knowledge database; and
transmitting through one of the plurality of second XML interfaces the retrieved information to said selected analytical engine for use during malware analysis.

6. The method of claim 1, wherein the selected two or more analytical engines analyze the suspicious object for presence of malware substantially at the same time.

7. The method of claim 1 further comprising:
if two or more selected analytical engines identify the suspicious object as malicious, but provide new or different information parameters for the identified malicious object, identifying in the knowledge database one or more correlated malicious objects and updating the identified correlated malicious objects with the new or different information parameters.

8. The system of claim 7 wherein the processor being further configured to:
if two or more selected analytical engines identify the suspicious object as malicious, but provide new or different information parameters for the identified malicious object, identify in the knowledge database one or more correlated malicious objects and update the identified correlated malicious objects with the new or different information parameters.

9. A system for detecting malware, the system comprising:
a memory being configured to store a knowledge database of information about known malicious and non-malicious objects; and
a processor coupled to the memory, the processor being configured to:
select from a plurality of analytical engines two or more different analytical engines for analyzing a suspicious object for presence of malware, wherein different analytical engines employ different malware analysis techniques;
provide to the selected analytical engines information about the suspicious object;
receive from the selected analytical engines results of the analysis of the suspicious object, wherein the results includes a plurality of information parameters associated with the suspicious object, including a parameter identifying the object as malicious or non-malicious;
if at least one analytical engine identifies the suspicious object as malicious and at least one other analytical engine identifies the suspicious object as non-malicious, identify correlations between one or more information parameters of the suspicious object and information parameters of other known malicious and non-malicious objects stored in a knowledge database, wherein two information parameters are correlated when said parameters are substantially similar to each other; and
identify the suspicious object as a malware if the number of identified malicious objects correlated to said suspicious object exceeds the number of identified non-malicious objects correlated to said suspicious object, wherein two objects are correlated when said objects have one or more correlated information parameters.

10. The system of claim 9, wherein the processor being further configured to:
provide a plurality of first different XML interfaces being customized to receive data from and transmit data to different security applications; and
provide a plurality of second different XML interfaces being customized to receive data from and transmit data to different analytical engines.

11. The system of claim 10, wherein the processor being further configured to:
receive, through one of the plurality of first XML interfaces, an information query about the suspicious object from a remote security application; and
transmit, through one of the plurality of first XML interfaces, the information about identified malicious object to the security application in response to the query.

12. The system of claim 10, wherein the selection of two or more analytical engines from the plurality of analytical engines is based at least in part on the balanced distribution of processing load among the plurality of different analytical engines.

13. The system of claim 10, wherein the processor being further configured to:
receive, through one of the plurality of second XML interfaces, from a selected analytical engine a request for information about a known malicious object during analysis of the suspicious object by said selected analytical engine;
retrieve the requested information from the knowledge database; and
transmit through one of the plurality of second XML interfaces the retrieved information to said selected analytical engine for use during malware analysis.

14. The system of claim 9, wherein the selected two or more analytical engines analyze the suspicious object for presence of malware substantially at the same time.

15. A computer program product embedded in a non-transitory computer-readable storage medium, the computer-readable storage medium comprising computer-executable instructions for detecting malware, the medium includes instructions for:
selecting from a plurality of analytical engines two or more different analytical engines for analyzing a suspicious object for presence of malware, wherein different analytical engines employ different malware analysis techniques;

providing to the selected analytical engines information about the suspicious object;

receiving from the selected analytical engines results of the analysis of the suspicious object, wherein the results includes a plurality of information parameters associated with the suspicious object, including a parameter identifying the object as malicious or non-malicious;

if at least one analytical engine identifies the suspicious object as malicious and at least one other analytical engine identifies the suspicious object as non-malicious, identifying correlations between one or more information parameters of the suspicious object and information parameters of other known malicious and non-malicious objects stored in a knowledge database, wherein two information parameters are correlated when said parameters are substantially similar to each other; and identifying the suspicious object as a malware if the number of identified malicious objects correlated to said suspicious object exceeds the number of identified non-malicious objects correlated to said suspicious object, wherein two objects are correlated when said objects have one or more correlated information parameters.

16. The computer program product of claim 15 further comprising instructions for:

providing a plurality of first different XML interfaces being customized to receive data from and transmit data to different security applications; and providing a plurality of second different XML interfaces being customized to receive data from and transmit data to different analytical engines.

17. The computer program product of claim 16 further comprising instructions for:

receiving, through one of the plurality of first XML interfaces, an information query about the suspicious object from a remote security application; and transmitting, through one of the plurality of first XML interfaces, the information about identified malicious object to the security application in response to the query.

18. The computer program product of claim 16, wherein selecting two or more analytical engines from the plurality of analytical engines is based at least in part on the balanced distribution of processing load among the plurality of different analytical engines.

19. The computer program product of claim 16, further comprising instructions for:

receiving, through one of the plurality of second XML interfaces, from a selected analytical engine a request for information about a known malicious object during analysis of the suspicious object by said selected analytical engine;

retrieving the requested information from the knowledge database; and transmitting through one of the plurality of second XML interfaces the retrieved information to said selected analytical engine for use during malware analysis.

20. The computer program product of claim 15, wherein the selected two or more analytical engines analyze the suspicious object for presence of malware substantially at the same time.

* * * * *